United States Patent
Song et al.

(10) Patent No.: US 9,625,766 B2
(45) Date of Patent: Apr. 18, 2017

(54) POST SPACER, DISPLAY PANEL AND DISPLAY DEVICE

(71) Applicants: BOE TECHNOLOGY GROUP CO., LTD., Beijing (CN); HEFEI XINSHENG OPTOELECTRONICS TECHNOLOGY CO., LTD., Hefei, Anhui (CN)

(72) Inventors: Xingxing Song, Beijing (CN); Chaohuan Hsu, Beijing (CN); Zhengwei Chen, Beijing (CN); Zhenfei Cai, Beijing (CN)

(73) Assignees: BOE TECHNOLOGY GROUP CO., LTD., Beijing (CN); HEFEI XINSHENG OPTOELECTRONICS TECHNOLOGY CO., LTD., Hefei, Anhui (CN)

( * ) Notice: Subject to any disclaimer, the term of this patent is extended or adjusted under 35 U.S.C. 154(b) by 0 days.

(21) Appl. No.: 14/573,256

(22) Filed: Dec. 17, 2014

(65) Prior Publication Data

US 2016/0026024 A1    Jan. 28, 2016

(30) Foreign Application Priority Data

Jul. 24, 2014  (CN) .......................... 2014 1 0355374

(51) Int. Cl.
*G02F 1/1341* (2006.01)
*H05B 33/04* (2006.01)
(Continued)

(52) U.S. Cl.
CPC ............ *G02F 1/13394* (2013.01); *G02F 2001/13398* (2013.01)

(58) Field of Classification Search
CPC ................ G02F 1/133514; G02F 1/13394
See application file for complete search history.

(56) References Cited

U.S. PATENT DOCUMENTS

| | | | |
|---|---|---|---|
| 2007/0070286 A1* | 3/2007 | Cho | G02F 1/13394 349/156 |
| 2007/0085967 A1* | 4/2007 | Park | G02F 1/13394 349/156 |
| 2007/0132936 A1* | 6/2007 | Lee | G02F 1/13394 349/156 |

FOREIGN PATENT DOCUMENTS

| | | |
|---|---|---|
| CN | 102804046 A | 11/2012 |
| CN | 102819181 A | 12/2012 |

(Continued)

OTHER PUBLICATIONS

Notification of the First Office Action dated Jun. 28, 2016 corresponding to Chinese application No. 201410355374.5.

(Continued)

*Primary Examiner* — John C Ingham
*Assistant Examiner* — Ismail Muse
(74) *Attorney, Agent, or Firm* — Nath, Goldberg & Meyer; Joshua B. Goldberg; Stanley N. Protigal

(57) ABSTRACT

The present invention relates to the technical field of display, and in particular to a post spacer, a display panel and a display device. The post spacer includes a support post and a support pillow, wherein the support pillow is formed of a plurality of sub-pillows dispersedly arranged below the bottom of the support post. Since the post spacer is provided with the support pillows dispersedly arranged below the bottom of the support post, the bottom of the support post can be more uniformly stressed, and the support pillow can further provide a certain antiskid effect. Therefore, the post spacer of the present invention has a better supporting effect and can effectively avoid Mura faults.

18 Claims, 3 Drawing Sheets

(51) Int. Cl.
*H01L 51/50* (2006.01)
*G02F 1/1339* (2006.01)

(56) References Cited

FOREIGN PATENT DOCUMENTS

| CN | 102998852 A | 3/2013 |
|---|---|---|
| CN | 103913898 A | 7/2014 |

OTHER PUBLICATIONS

Notification of the Second Office Action dated Dec. 2, 2016 corresponding to Chinese application No. 201410355374.5.

\* cited by examiner

POST SPACER, DISPLAY PANEL AND DISPLAY DEVICE

FIELD OF THE INVENTION

The present disclosure relates to the technical field of display, and in particular to a post spacer, a display panel and a display device.

BACKGROUND OF THE INVENTION

A liquid crystal display device is a mainstream flat-panel display product currently, and a liquid crystal panel is one of the most important components. The liquid crystal panel includes a color filer (Color Filer) substrate and an array (Array) substrate which are arranged in a cell alignment manner, and liquid crystals are arranged therebetween. In order to maintain a liquid crystal cell gap and prevent the normal display failure of the liquid crystals due to deformation resulting from extrusion, a post spacer (referred to as PS) is generally arranged between the color filer substrate and the array substrate.

In order to guarantee a fixed position of the post spacer and achieve a better supporting effect, to ensure a fixed liquid crystal cell gap, as shown in FIG. 1, the post spacer is arranged to include a support post 1 and a support pad 2, which are separated. The support post 1 is arranged above an array pattern 21 of the array substrate 20 through the support pad 2. As shown in FIG. 2, the existing support pad 2 generally adopts a single-piece design. The support pad 2 with such single-piece design can perform a certain function of enhancing the supporting effect of the support post 1. However, a certain pressure will be applied on the display panel in a cell alignment process, and the support post 1 may slide away from the support pad 2 with the single-piece design under the pressure, resulting in that the support post 1 fails to achieve an ideal supporting effect causing uneven liquid crystal cell gap. As a result, Mura faults such as "black gap" and the like can be generated, causing a significant impact on the quality of the display product.

SUMMARY OF THE INVENTION

The technical problem to be solved in the present disclosure is to provide a post spacer, a display panel and a display device, aiming at the above-mentioned defects in the prior art. The post spacer is provided with support pads dispersedly arranged below a bottom of a support post, so as to transfer a force applied on the display panel to the support post through the dispersedly arranged support pads. Therefore, the bottom of the support post can be more uniformly stressed, and moreover, the support pads can further provide a certain antiskid effect. Therefore, the post spacer provided by the disclosed technology has a better supporting effect and can effectively avoid Mura faults.

To solve the above-mentioned technical problem, the technical solution of the present disclosure is to provide a post spacer. The post spacer includes a support post and a support pad, wherein the support pad is formed of a plurality of sub-pads dispersedly arranged below the bottom of the support post.

Preferably, the plurality of sub-pads are uniformly distributed in the peripheral area of the bottom of the support post, and an arrangement shape of the plurality of sub-pads is matched with a shape of the bottom of the support post.

Preferably, the peripheral area of the bottom of the support post includes an area extending inwards by 10-20% of a bottom diameter in the radial direction from an edge of the bottom of the support post.

Preferably, the peripheral area of the bottom of the support post includes an area extending inwards by 10% of the bottom diameter in the radial direction from the edge of the bottom of the support post.

Preferably, the plurality of sub-pads are uniformly distributed on the edge of bottom of the support post, such that a part of the sub-pad is located inside of the bottom of the support post and the other part thereof is located outside of the bottom of the support post.

Preferably, a height of the part of the sub-pad located inside of the bottom of the support post is lower than a height of the other part of the sub-pad located outside of the bottom of the support post.

Preferably, the support pad further includes a central sub-pad arranged at the center of the bottom of the support post.

Preferably, the sub-pad is formed into a shape of a rhombus, a circle or a regular polygon.

The present disclosure further provides a display panel, including the above-mentioned post spacer.

Preferably, the display panel includes a color filer substrate and an array substrate, wherein the support post is arranged on a side of the color filer substrate facing to the array substrate, the support pad is arranged on a side of the array substrate facing to the color filer substrate, and a projection position of the support pad corresponds to that of the support post in a direction vertical to the array substrate.

Preferably, the array substrate includes a grid electrode, a source electrode and a drain electrode, as well as a grid line connected with the grid electrode and a data line connected with the source electrode, and the support pad is arranged in an area corresponding to the grid line or the data line.

Preferably, the support pad is made from the same material as the grid electrode or the source electrode/the drain electrode and is formed in the same composition process.

The present disclosure further provides a display device, including the above-mentioned display panel.

Beneficial effects of the disclosed technology are as follows: in the post spacer according to the present disclosure, since the support pad is provided with a plurality of sub-pads which are uniformly distributed in the peripheral area of the support post, the pressure applied on the support post in the cell alignment process is relatively balanced, and the support pad further has an antiskid effect. In addition, the post spacer according to the present disclosure can further provide a better supporting effect for the color filer substrate and the array substrate, ensure the uniformity of the liquid crystal cell gap and reduce or eliminate the Mura faults in the display panel, so as to guarantee the quality of the display product.

BRIEF DESCRIPTION OF THE DRAWINGS

In the description, the same reference number/sign shows the same or similar device/part, in which, "1" is a support post; "2" is a support pad; "10" is a color filer substrate; "11"

is a color filer pattern; "20" is an array substrate; "21" is an array pattern; "22" is a grid line.

DETAILED DESCRIPTION OF THE EMBODIMENTS

To make those skilled in the art better understand the technical solutions of the disclosed technology, the post spacer, the display panel and the display device of the disclosed technology will be described in detail below in connection with the accompanying drawings and specific embodiments.

First Embodiment

Figure 1:
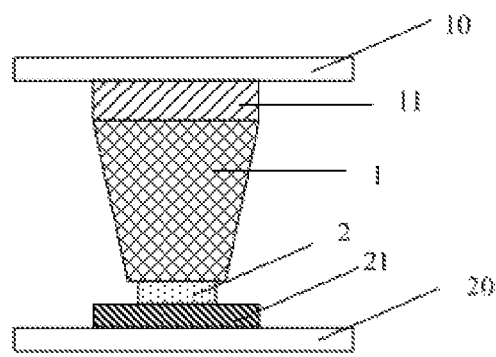
FIG. 1 is a schematic diagram showing a structure of a post spacer in a display panel.
Figure 2:
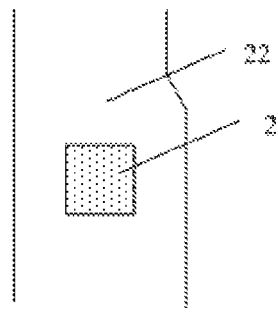
FIG. 2 is a top view of a support pad in the prior art.

As shown in FIG. 1, the post spacer includes a support post 1 and a support pad 2. According to the embodiment, the support pad 2 may include a plurality of sub-pads which are dispersedly arranged below the bottom of the support post 1. Furthermore, as shown in FIG. 3 to FIG. 6, the post spacer according to the embodiment adopts the dispersedly arranged support pads 2, such that the force applied on the display panel can be transferred to the support post 1 through the dispersedly arranged support pads 2. Therefore, the bottom of the support post 1 can be more uniformly stressed. Thus, the post spacer according to the disclosed technology has a better supporting effect, whereby effectively avoiding Mura faults.

In the embodiment, as shown in FIG. 3 to FIG. 6, the sub-pads are uniformly distributed in a peripheral area of the bottom of the support post 1, and the arrangement shape of the multiple sub-pads is matched with the shape of the bottom of the support post 1 (in the embodiment, the support post 1 with a circular bottom is taken as an example). In the embodiment, the peripheral area of the bottom of the support post 1 can include an area extending inwards 10-20% of a bottom diameter in the radial direction from an edge of the bottom of the support post 1; preferably, the peripheral area can include an area extending inwards 10% of the bottom diameter in the radial direction from the edge of the bottom of the support post 1.

Figure 3:
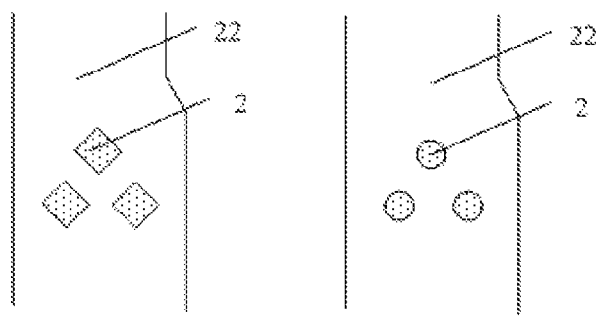
FIGS. 3 to 6 are top views of a support pad according to a first embodiment.
Figure 4:
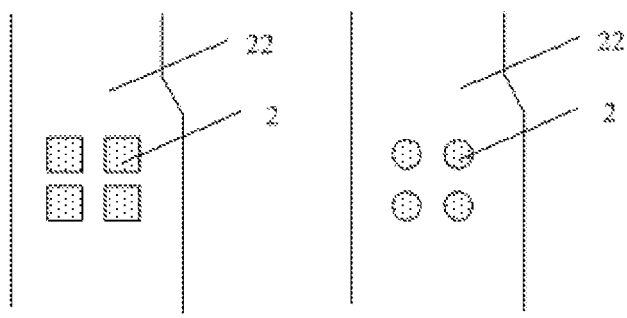
Figure 5:
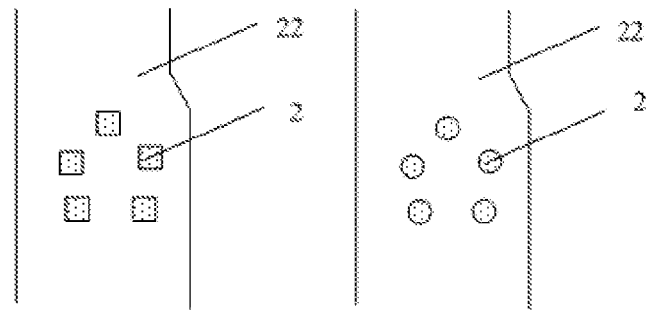
Figure 6:
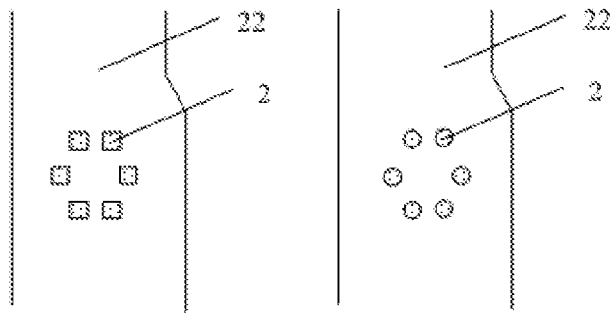

In order to facilitate the preparation of the post spacer, preferably, the sub-pads are each formed into a shape of a rhombus, a circle or a regular polygon. Meanwhile, as shown in FIG. 3 to FIG. 6, the number of the sub-pads is not limited. Depending on a size of the post spacer, there can be 3-6 sub-pads. Of course, the number of the sub-pads can be larger than 6. The above-mentioned sub-pads are uniformly distributed. For example, as shown in FIG. 3 to FIG. 6, 3 sub-pads may be distributed at three positions of vertexes formed into a regular triangle (as shown in FIG. 3) at the bottom of the support post 1, respectively, 4 sub-pads may be distributed at four positions of vertexes formed into a square (as shown in FIG. 4) at the bottom of the support post 1, respectively, 5 sub-pads may be distributed at five positions of vertexes formed into a regular pentagon (as shown in FIG. 5) at the bottom of the support post 1, respectively, 6 sub-pads may be distributed at six positions of vertexes formed into a regular hexagon (as shown in FIG. 6) at the bottom of the support post 1, respectively, etc.

Correspondingly, the disclosed technology further provides a display panel, including the post spacer according to the embodiment. As shown in FIG. 1, the display panel includes a color filer substrate 10 and an array substrate 20, and the support post 1 is arranged on the side of the color filer substrate 10 facing to the array substrate 20 and is arranged on a color filer pattern 11 (e.g., a black matrix pattern); the support pad 2 is located on the side of the array substrate 20 facing to the color filer substrate 10 and is arranged on an array pattern 21 (e.g., a passivation layer pattern). The projection position of the support pad 2 corresponds to that of the support post 1 in a direction vertical to the array substrate 20. The structure of the display panel in the embodiment is not limited thereto. For example, the display panel can include the array substrate and a cell substrate, wherein the array pattern and the color filer pattern are each arranged on the array substrate, the support post is arranged on the side of the cell substrate facing to the array substrate and corresponds to a position of the array substrate provided with a pattern, and the support pad is arranged on the side of the array substrate facing to the cell substrate.

In order to control pixel display, the array substrate 20 includes a grid electrode, a source electrode and a drain electrode, as well as a grid line connected with the grid electrode and a data line connected with the source electrode (the above-mentioned structures are not shown in FIG. 1). The support pad 2 is arranged in an area corresponding to the grid line or the data line. In the display panel, the area corresponding to the grid line or the data line is generally a light-proof area in which the post spacer is arranged, so as to ensure a normal operation of the display panel.

In the disclosed technology, the grid electrode or the source electrode/the drain electrode can be made from a metallic material, the support pad 2 can be made from the same material as the grid electrode or the source electrode/the drain electrode and is formed in the same composition process. Preferably, the metallic material forming the grid electrode or the source electrode/the drain electrode may include at least one of the materials of molybdenum (Mo), molybdenum niobium alloy (MoNb), aluminum (Al), aluminum neodymium alloy (AlNd), titanium (Ti) or copper (Cu). When the array substrate 20 is in the case that the grid electrode is located above the source electrode/the drain electrode (i.e., the array substrate includes a top grid type thin film transistor), the support pad 2 may be made from the same material as the grid electrode and the grid line, formed in the same composition process and arranged in an area corresponding to the data line; when the array substrate 20 is in the case that the source electrode/the drain electrode is located above the grid electrode (i.e., the array substrate includes a bottom grid type thin film transistor), the support pad 2 may be made from the same material as the source electrode/the drain electrode and the data line, formed in the same composition process and arranged in an area (i.e., an upper side of the grid line 22 as shown in FIG. 3 to FIG. 6) corresponding to the grid line. In the specific composition process, the main body of the support pad 2 may be made from the metallic material used for forming the grid electrode or for forming the source electrode/the drain electrode, and the arrangement pattern of the support pad 2 as shown in FIG. 3 to FIG. 6 may be acquired in an exposure process.

The support post 1 can be made from a resin material and be formed on the color filer pattern 11 of the color filer substrate 10. When the color filer substrate 10 and the array substrate 20 are subjected to a cell alignment, the support post 1 is aligned to the support pad 2, and the color filer substrate 10 and the array substrate 20 are integrally formed by a sealant.

Aiming at such problems that the existing single-piece support pad 2 is inclined to cause a slide of the support post 1, a plurality of support pads 2 are provided in the post spacer according to the embodiment, in turn to provide a plurality of support points for the support post 1 to improve the supporting effect; meanwhile, since the plurality of support pads 2 are provided in the post spacer according to the embodiment, it is also possible to effectively increase the friction force, improve the antiskid performance and greatly reduce the Mura faults of the display panel.

Second Embodiment

Compared with the first embodiment, the support pad 2 in the post spacer of the embodiment further includes a sub-pad corresponding to the center of the bottom of the support post 1 (also referred to as a central sub-pad).

Figure 7:
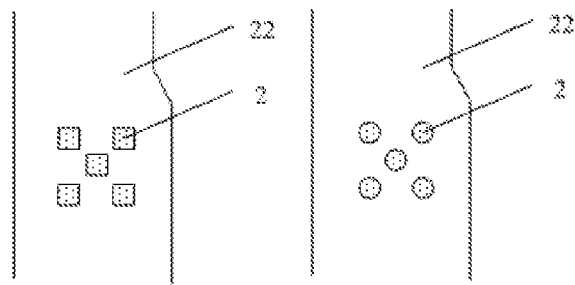
FIGS. 7 to 8 are top views of a support pad according to a second embodiment.
Figure 8:
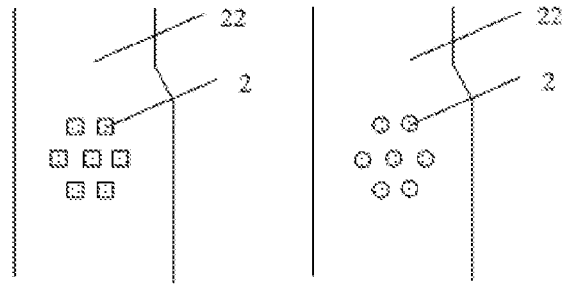
Figure 9:
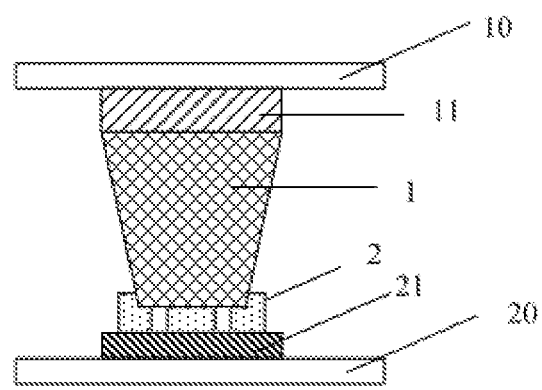
FIG. 9 is a schematic diagram showing a structure of the post spacer according to an alternate embodiment.

On the basis of the arrangement pattern of the support pad 2 as shown in FIG. 4 and FIG. 6, as shown in FIG. 7 and FIG. 8, the central sub-pad is arranged at the central position (i.e., a position corresponding to the center of the support post 1) of the arrangement pattern of the support pad 2. In the embodiment, the central sub-pad is preferably located on the center shaft of the support post 1, such that it can cooperate with the sub-pads at the periphery so as to provide more stable support for the support post 1.

Correspondingly, the disclosed technology further provides a display panel, including the post spacer according to the embodiment. The arrangement of the post spacer according to this embodiment in the display panel is the same as that in the first embodiment, and the detailed description thereof will be omitted herein.

Similarly, the display panel provided with the post spacer according to the embodiment can greatly reduce the Mura (Mura) faults of the display panel, so as to improve the display quality.

Third Embodiment

Compared with the first and second embodiments, the plurality of sub-pads of the post spacer in the embodiment are not arranged inside of the bottom (or the projection area of the bottom in the vertical direction) of the support post 1, but are uniformly distributed at the edge of the bottom of the support post 1. That is to say, a part of each sub-pad is located inside of the bottom (or the projection area of the bottom in the vertical direction) of the support post 1, and the other part thereof is located outside of the bottom (or the projection area of the bottom in the vertical direction) of the support post 1.

Preferably, a height of the part of each sub-pad located inside of the bottom of the support post is lower than a height of the other part of the sub-pad located outside of the bottom of the support post. In this case, in the embodiment, the sub-pads form a stepped structure with a low inside and a high outside. Therefore, besides the capability of providing the stable supporting effect for the support post 1, the support post 1 can be prevented from deviating from the support pad 2, whereby ensuring that the support post is constantly located in the area limited by the sub-pads of the support pad.

In the preparation process of the display panel, depending on different types of thin film transistors included in the array substrate, a double-tone mask can be used for forming the support pad according to the embodiment during the formation of the grid electrode, the source electrode/the drain electrode, and thus no steps in the preparation process of the display panel will be increased.

Correspondingly, the disclosed technology further provides a display panel, including the post spacer according to this embodiment. The arrangement of the post spacer according to the embodiment in the display panel is the same as that in the first embodiment, and the detailed description thereof will be omitted herein.

Similarly, the display panel provided with the post spacer according to the embodiment can greatly reduce the Mura (Mura) faults of the display panel, so as to improve the display quality.

In the post spacer according to the first to the third embodiments of the disclosed technology, since the support pad is provided with a plurality of sub-pads which are uniformly distributed in the peripheral area of the support post, the pressure applied on the support post in the cell alignment process is relatively balanced, and the support pad can further provide a certain antiskid effect. In addition, the post spacer according to the disclosed technology can provide a better supporting effect for the color filer substrate and the array substrate, ensure the uniformity of the liquid crystal cell gap and reduce or eliminate the Mura (Mura) faults in the display panel, so as to guarantee the quality of the display product.

In addition, the post spacer provided with the dispersed sub-pads is especially suitable for the display panel with an array substrate adopting an oxide thin film transistor. On the one hand, in the existing preparation process, the oxide process is more complicated and less mature than the amorphous silicon (a-Si) process; on the other hand, the support pad is scarcely applied in the field of the oxide thin film transistor, thus lacking experience in the industry. Therefore, under an external force or in a fluctuation of the preparation process, faults such as black gap Mura and the like may be liable to generate. As shown in actual production data analysis, the occurrence rate of black gap Mura in oxide thin film transistor products is actually higher than that of amorphous silicon a-Si thin film transistor products. Experiments prove that, by adopting the post spacer provided with the dispersed sub-pads according to the disclosed technology, the faults such as the black gap Mura and the like caused by the display panel with the array substrate adopting the oxide thin film transistor can be effectively relieved, whereby reducing requirements on the preparation process of the oxide thin film transistor.

The disclosed technology further provides a display device provided with a display panel, wherein the display panel may include the post spacer according to any one of the first to the third embodiments.

The display device can be used as any product or component with a display function, such as a liquid crystal panel, an electronic paper, a mobile phone, a tablet computer, a TV, a display, a notebook computer, a digital photo frame, a navigator, etc.

Since the display device includes the post spacer according to any one of the first to the third embodiments, it can have a better display effect.

It can be understood that, the foregoing embodiments are merely exemplary embodiments for illustrating the principle of the disclosed technology. However, the disclosed technology is not limited thereto. Those of ordinary skill in the art can make various variations and improvements without departing from the spirit and essence of the disclosed technology, and these variations and improvements are also interpreted as falling within the protection scope of the present disclosure.

The invention claimed is:
1. A post spacer, comprising:
a support post; and
a support pad, wherein the support pad is formed of a plurality of sub-pads dispersedly arranged below a bottom of the support post, the support pad comprising sub-pads uniformly distributed on the edge of the bottom of the support post, with a part of the sub-pad located inside of the bottom of the support post and the other part of the sub-pad located outside of the bottom of the support post, the part located outside of the bottom of the support post contacting a sidewall of the support post; and the part of the sub-pad located inside of the bottom of the support post contacting the support post and having a height lower than a height of the other part of the sub-pad located outside of the bottom of the support post.

2. The post spacer of claim 1, wherein the plurality of sub-pads are uniformly distributed in a peripheral area of the bottom of the support post, and an arrangement shape of the plurality of sub-pads is matched with a shape of the bottom of the support post.

3. The post spacer of claim 2, wherein the peripheral area of the bottom of the support post comprises an area extending inwards by 10-20% of a bottom diameter in the radial direction from an edge of the bottom of the support post.

4. The post spacer of claim 3, wherein the peripheral area of the bottom of the support post comprises an area extending inwards by 10% of the bottom diameter in the radial direction from the edge of the bottom of the support post.

5. The post spacer of claim 2, wherein the support pad further comprises a central sub-pad arranged at the center of the bottom of the support post.

6. The post spacer of claim 1, wherein the sub-pad is formed into a shape of a rhombus, a circle or a regular polygon.

7. A display panel, comprising the post spacer of claim 1.

8. The display panel of claim 7, comprising:
a color filer substrate; and
an array substrate, wherein the support post is arranged on a side of the color filer substrate facing to the array substrate, the support pad is arranged on a side of the array substrate facing to the color filer substrate, and a projection position of the support post corresponds to that of the support pad in a direction vertical to the array substrate.

9. The display panel of claim 8, wherein the array substrate comprises a grid electrode, a source electrode and a drain electrode, as well as a grid line connected with the grid electrode and a data line connected with the source electrode, and the support pad is arranged in an area corresponding to the grid line or the data line.

10. The display panel of claim 1 wherein the support pad is made from the same material as the grid electrode or the source electrode/the drain electrode and is formed in the same composition process.

11. The display panel of claim 7, wherein the plurality of sub-pads are uniformly distributed in a peripheral area of the bottom of the support post, and an arrangement shape of the plurality of sub-pads is matched with a shape of the bottom of the support post.

12. The display panel of claim 7, wherein the support pad further comprises a central sub-pad arranged at the center of the bottom of the support post.

13. A display device comprising the display panel of claim 7.

14. The display device of claim 13, comprising:
a color filer substrate and an array substrate, wherein the support post is arranged on a side of the color filer substrate facing to the array substrate, the support pad is arranged on a side of the array substrate facing to the color filer substrate, and a projection position of the support post corresponds to that of the support pad in a direction vertical to the array substrate.

15. The display device of claim 14, wherein the array substrate comprises a grid electrode, a source electrode and t drain electrode, as well as a grid line connected with the grid electrode and a data line connected with the source electrode, and the support pad is arranged in an area corresponding to the grid line or the data line.

16. The display device of claim 15, wherein the support pad is made from the same material as the grid electrode or the source electrode/the drain electrode and is formed in the same composition process.

17. The display device of claim 13, wherein the plurality of sub-pads are uniformly distributed in a peripheral area of the bottom of the support post, and an arrangement shape of the plurality of sub-pads is matched with a shape of the bottom of the support post.

18. The display device of claim 13, wherein the support pad further comprises a central sub-pad arranged at the center of the bottom of the support post.

* * * * *